(12) United States Patent
McGraw, IV et al.

(10) Patent No.: US 12,327,235 B2
(45) Date of Patent: *Jun. 10, 2025

(54) TOUCHLESS TRANSACTION ON A TRANSACTION TERMINAL

(71) Applicant: NCR Atleos Corporation, Atlanta, GA (US)

(72) Inventors: William Harrison McGraw, IV, Albemarle, NC (US); Deepak Aladahalli Puttaswamy, Atlanta, GA (US); Michael David Hartman, Milton, GA (US)

(73) Assignee: NCR Atleos Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,984

(22) Filed: Feb. 27, 2024

(65) Prior Publication Data

US 2024/0202699 A1    Jun. 20, 2024

Related U.S. Application Data

(60) Continuation of application No. 17/541,734, filed on Dec. 3, 2021, now Pat. No. 12,014,351, which is a
(Continued)

(51) Int. Cl.
*G06Q 20/32* (2012.01)
*G06Q 20/22* (2012.01)
(Continued)

(52) U.S. Cl.
CPC ....... *G06Q 20/3276* (2013.01); *G06Q 20/223* (2013.01); *G06Q 20/3224* (2013.01);
(Continued)

(58) Field of Classification Search
None
See application file for complete search history.

(56) References Cited

U.S. PATENT DOCUMENTS

| 8,632,000 | B2 | 1/2014 | Laracey |
| 11,727,386 | B2 * | 8/2023 | McGraw, IV ......... H04L 67/025 705/44 |

(Continued)

FOREIGN PATENT DOCUMENTS

| EP | 2453419 A2 | 5/2012 |
| EP | 2453419 A3 | 6/2012 |

(Continued)

OTHER PUBLICATIONS

"U.S. Appl. No. 16/877,203, Advisory Action mailed Feb. 2, 2023", 3 pgs.

(Continued)

*Primary Examiner* — Scott S Trotter
*Assistant Examiner* — Amit Patel
(74) *Attorney, Agent, or Firm* — Schwegman Lundberg & Woessner, P.A.

(57) ABSTRACT

A transaction is detected on a transaction terminal. A first code is presented on a display of the transaction terminal that is encoded with an identifier and a passcode for a wireless connection between the transaction terminal and a mobile device operated by a customer. The mobile device processes the code to wirelessly connect to the transaction terminal using the identifier and the passcode. A second code is presented on a display of the transaction terminal. The second code when captured by the mobile device causes a transaction interface to be remoted from the transaction terminal to the mobile device over the wireless connection. The transaction continues with interactions provided on the mobile device and processed on the transaction terminal without any customer touching of the display of the trans- (Continued)

action terminal and without any customer touching of any keys or keypad of the transaction terminal.

20 Claims, 4 Drawing Sheets

Related U.S. Application Data division of application No. 16/877,203, filed on May 18, 2020, now Pat. No. 11,727,386.

(51) Int. Cl.
  *G06Q 20/34* (2012.01)
  *G06Q 20/40* (2012.01)
(52) U.S. Cl.
  CPC ......... *G06Q 20/325* (2013.01); *G06Q 20/352* (2013.01); *G06Q 20/4012* (2013.01)

(56) References Cited

U.S. PATENT DOCUMENTS

| | | | |
|---|---|---|---|
| 2008/0313079 A1* | 12/2008 | Van Bosch | G06Q 20/326 235/379 |
| 2011/0099497 A1 | 4/2011 | Fok et al. | |
| 2012/0160912 A1 | 6/2012 | Laracey | |
| 2013/0085941 A1 | 4/2013 | Rosenblatt et al. | |
| 2013/0124855 A1 | 5/2013 | Varadarajan et al. | |
| 2018/0330367 A1 | 11/2018 | Sharma | |
| 2019/0073663 A1 | 3/2019 | Jamkhedkar et al. | |
| 2019/0378345 A1 | 12/2019 | Mossoba et al. | |
| 2021/0357906 A1 | 11/2021 | Mcgraw, IV et al. | |

FOREIGN PATENT DOCUMENTS

| | | | |
|---|---|---|---|
| JP | 2016530645 A | 9/2016 | |
| JP | 2018010332 A | 1/2018 | |

OTHER PUBLICATIONS

"U.S. Appl. No. 16/877,203, Advisory Action mailed Mar. 28, 2022", 3 pgs.
"U.S. Appl. No. 16/877,203, Final Office Action mailed Jan. 6, 2022", 12 pgs.
"U.S. Appl. No. 16/877,203, Final Office Action mailed Nov. 16, 2022", 13 pgs.
"U.S. Appl. No. 16/877,203, Non Final Office Action mailed Apr. 26, 2022", 13 pgs.
"U.S. Appl. No. 16/877,203, Non Final Office Action mailed Sep. 17, 2021", 25 pgs.
"U.S. Appl. No. 16/877,203, Notice of Allowance mailed Mar. 28, 2023", 18 pgs.
"U.S. Appl. No. 16/877,203, Response filed Jan. 18, 2023 to Final Office Action mailed Nov. 16, 2022", 8 pgs.
"U.S. Appl. No. 16/877,203, Response filed Feb. 16, 2023 to Advisory Action mailed Feb. 2, 2023", 9 pgs.
"U.S. Appl. No. 16/877,203, Response filed Mar. 7, 2022 to Final Office Action mailed Jan. 6, 2022", 7 pgs.
"U.S. Appl. No. 16/877,203, Response filed Apr. 6, 2022 to Advisory Action mailed Mar. 28, 2022", 8 pgs.
"U.S. Appl. No. 16/877,203, Response filed Jun. 11, 2021 to Restriction Requirement mailed Apr. 15, 2021", 9 pgs.
"U.S. Appl. No. 16/877,203, Response filed Jul. 26, 2022 to Non Final Office Action mailed Apr. 26, 2022", 8 pgs.
"U.S. Appl. No. 16/877,203, Response filed Dec. 17, 2021 to Non Final Office Action mailed Sep. 17, 2021", 8 pgs.
"U.S. Appl. No. 16/877,203, Restriction Requirement mailed Apr. 15, 2021", 8 pgs.
"U.S. Appl. No. 17/541,734, Non Final Office Action mailed Aug. 4, 2023", 34 pgs.
"U.S. Appl. No. 17/541,734, Notice of Allowance mailed Feb. 15, 2024", 13 pgs.
"U.S. Appl. No. 17/541,734, Preliminary Amendment filed Dec. 9, 2021", 7 pgs.
"U.S. Appl. No. 17/541,734, Response filed Nov. 1, 2023 to Non Final Office Action mailed Aug. 4, 2023", 9 pgs.
"European Application Serial No. 21165422.3, Communication pursuant to Article 94(3) EPC mailed Oct. 11, 2023", 4 pgs.
"Japanese Application Serial No. 2022-211157, Notice of Reasons for Refusal mailed Oct. 27, 2023", w/ English Machine Translation, 10 pgs.

* cited by examiner

TOUCHLESS TRANSACTION ON A TRANSACTION TERMINAL

CROSS-REFERENCE TO RELATED APPLICATIONS

This application is a continuation of U.S. patent application Ser. No. 17/541,734, filed Dec. 3, 2021, which is a division of U.S. patent application Ser. No. 16/877,203, filed May 18, 2020, which applications and publications are incorporated herein by reference in their entirety.

BACKGROUND

Touch-based displays and input keypads are prevalent to facilitated consumer-based commerce throughout the industry, such as in retail, hospitality, and banking. Transaction terminals can be operated by attendants on behalf of customers for cashier-assisted checkouts or can be self-operated by the customers for self-checkouts using touches made on the displays and/or keypads associated with the terminals.

However, the touch-surfaces of the displays and keypads often harbor bacteria and viruses. Bacteria and viruses can live on the touch-surfaces or keypads for hours if not days. Moreover, the touch display surfaces are touched in the exact same display locations repeatedly by different people throughout the business hours of a store. Transaction interfaces, which are presented within screens on the displays will render touchable options in a consistent and a same location, which ensures that different people operating the terminals for checkouts during business hours are all touching a potentially hazardous and contaminated surface.

Furthermore, the terminal displays and keypads are typically located at eye level or below the mouth and nose of an average consumer, such that the touch surfaces and keypads are often sprayed with bacteria and viruses throughout the day by attendants or customers that cough or sneeze during checkouts.

Given what is transpiring in the world with the COVID-19 virus, retailers are rightly concerned about the health and safety of their customers and their employees, who are repeatedly touching a same touch surface and keypad of a display throughout the day.

In view of COVID-19, most stores have shut down operations for at least a few hours a day to disinfect all store surfaces, which presumably includes disinfecting touch surfaces of the transaction displays and keypads of terminals. But, disinfecting each touchscreen display and keypad after each customer operates a single terminal is unrealistic and unachievable during business hours especially when grocery stores are extraordinarily busy during the pandemic and many Automated Teller Machines (ATMs) are dispersed throughout the community and are often unattended completely; therefore, checkout/transaction processing at stores/locations remains a substantial health and safety concern in the industry.

Additionally, grocery stores and banks are unable to completely shut down for business because people have to have food to survive and people need ATMs for cash to purchase the food; consequently, both grocery stores and banks have been properly designated as essential services. No country has the ability to acquire and distribute food to all their citizens in their homes, which would require an unfathomable amount of planning, distribution resources, and human resources. Similarly, no country has the ability to collect and distribute cash to its citizens at a time when large swatches of the country are in urgent need of cash to survive day to day during the pandemic. Consequently, grocery stores must remain open and ATMs must be operational and available during a pandemic.

SUMMARY

In various embodiments, methods and a system for touchless transactions on transaction terminals are presented.

According to an aspect, a method for a touchless transaction on a transaction terminal is presented. A transaction is detected as having been initiated by a customer at a transaction terminal. A first code is rendered on a display of the transaction terminal and a communication port is activated on the transaction terminal. The communication port establishes a connection between a mobile device and the transaction terminal based on information that was encoded in the first code and provided by the mobile device to the communication port. The communication port is a wired port for a wired connection between the transaction terminal and the mobile device or the communication port is a wireless transceiver for a wireless connection between the transaction terminal and the mobile device. A second code is rendered on the display of the transaction terminal based on the establishing of the connection. A confirmation is received from the mobile device responsive to the second code over the connection. A transaction interface associated with the transaction is remoted over the connection to the mobile device for completing the transaction without any customer touching of the display and without any customer touching of keys of the transaction terminal.

DETAILED DESCRIPTION

Figure 1:
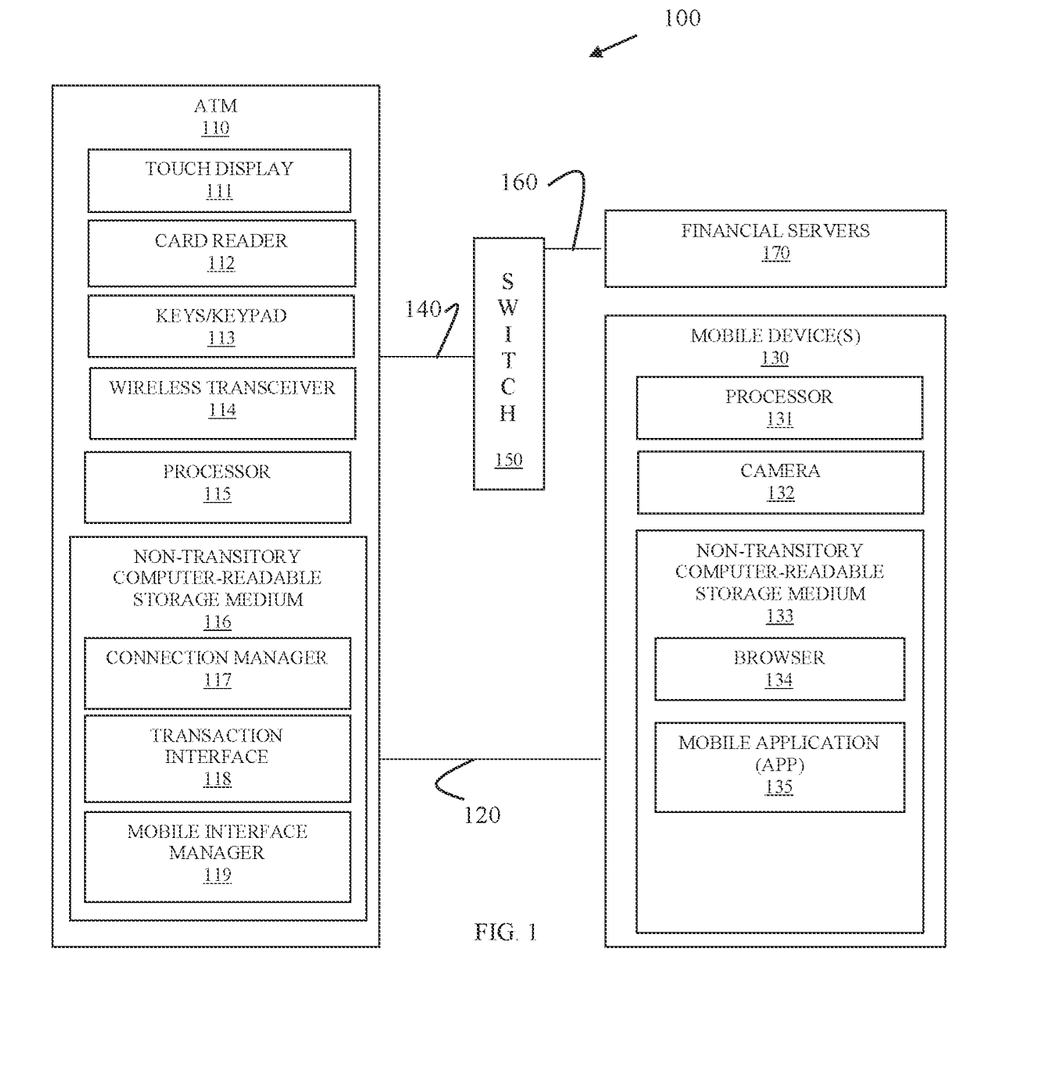
FIG. 1 is a diagram of a system for a touchless transaction on a transaction terminal, according to an example embodiment.

FIG. 1 is a diagram of a system 100 for a touchless transaction on a transaction terminal, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of touchless operation of a transaction terminal presented herein and below.

The system 100 provides a mechanism by which transaction interfaces can be operated without any (or substantially without any) touching of touch-based displays or keypads of a transaction terminal. The mechanism is achieved with minimal changes to existing and legacy transaction interfaces of the transaction terminals. System 100 substantially decreases or eliminates the risk of exposure to bacteria and viruses by attendants/cashiers and customers during transactions at the transaction terminals by substantially reducing or eliminating touch interactions on potentially contaminated surfaces (touch displays and keypads where such touches would conventionally be required without the teachings provided herein).

System 100 includes: an Automated Teller Machine (ATM) 110 (may also be referred to herein as "transaction terminal 110," or "terminal 110"), a network switch 150, a mobile device 130, and a plurality of financial servers 170.

ATM 110 includes a touch display 111, a card reader 112, keys/keypad 113, a wireless transceiver 114, a processor 115, a non-transitory computer-readable storage medium 116 having executable instructions representing a connection manager 117, a transaction interface 118, and a mobile interface manager 119. The executable instructions when executed by processor 115 of ATM 110 from non-transitory computer-readable storage medium 116 cause processor 115 to perform processing discussed below herein and below as connection manager 117, transaction interface 118, and mobile interface manager 119.

It is noted that ATM 110 may include a variety of other peripheral devices, such as and by way of example only: a scanner, a currency and/or coin accepter, a currency and/or coin dispenser, a valuable media depository, a valuable media recycler, a camera, and a receipt printer. It is noted that just the peripheral devices of touch display 111, card reader 112, keys/keypad 113, and wireless transceiver 114 are necessary for understanding and comprehending the beneficial health and safety teachings that follow.

Mobile device 130 is operated by a customer who is performing an ATM transaction at ATM 110. Mobile device 130 includes a processor 131, a camera 132, and a non-transitory computer-readable storage medium 133 comprising executable instructions representing a web browser 134 and/or a mobile application 135. The executable instructions when executed by processor 131 of mobile device 130 from non-transitory computer-readable storage medium 133 causes processor 131 to perform processing discussed herein and below with respect to web browser 134 and/or mobile application 135.

Switch 150 is a network router that allows ATM 110 to authorize ATM transactions through backend systems of appropriate financial servers 170 associated with the transactions. Financial servers 170 include backend systems that authorize ATM transactions for specific accounts of specific financial institutions. ATM 110 is connected through a wired connection 140 to switch 150. Switch 140 includes a secure Wide Area Network (WAN) 160 to financial servers 170.

During operation of system 100, transaction interface 118 presents an initial transaction screen rendered on touch display 111 for customers to initiate an ATM transaction. When a bankcard is presented by the customer to card reader 112 (contact-based with card inserted into card reader 112 or contactless with card waived over a Near Field Communication (NFC card reader 112), transaction interface 118 requests that the customer use keypad 113 (encrypted Personal Identification Number (PIN) pad) to enter a PIN linked to an account of the customer with a particular Financial Institution (FI) for authentication of the customer.

In an embodiment, the customer presses on encrypted PIN pad 113 to enter the customer's PIN.

Once a PIN is received, connection manager 117 generates an encoded barcode or Quick Response (QR) code that is rendered on a transaction screen of touch display 111. Connection manager 117 generates the code with an encoded Service Set Identifier (SSID) that identifies wireless network 120 being transaction by ATM 110 from wireless transceiver 114 and a passcode for wirelessly communicating with mobile device 130 and connecting ATM 110 with mobile device 130 over a wireless Peer-to-Peer (P2P) connection 120. The transaction screen rendered by transaction interface 118 may also include descriptive text that labels the code presented on touch display 111 as being a wireless connection option activated upon capture by camera 132 of mobile device 130.

Just prior to presenting the code with the descriptive text on touch display 111, connection manager 117 activates a previously deactivated wireless transceiver 114 and configures wireless transceiver for accepting and establishing wireless P2P connection 120 using the SSID and passcode generated by connection manager 117.

Once the code is rendered on touch display 111, the customer can elect to utilize the health safety measures associated with continuing the ATM transaction at ATM 110 as described herein and below or the customer can use conventional touches to options for the transaction utilizing touch display 111 and/or keys/keypad 113.

Assuming the customer wishes to proceed with the ATM transaction with no further touches being required to complete the transaction, the customer activates mobile application (app) 135 on mobile device 130. Mobile app 135 starts up with camera 132 activated looking for the code rendered on touch display 111. Once camera 132 detects and captures the code (after the customer points the camera's focus on the code presented on display 111), mobile app 135 decodes the code and obtains the SSID and passcode expected by and permitted by wireless transceiver 114. Mobile application 135 accesses mobile device's wireless transceiver and connects to the wireless signal associated with wireless transceiver 114 using the SSID and passcode. Connection manager 117 permits wireless P2P connection 120 between ATM 110 and mobile device 130 and activates mobile interface manager 119.

Once the wireless P2P connection 120 is established, connection manager 117 generates a second encoded barcode or QR code that includes encoded instructions for remoting interface screens and options associated with those screens on mobile device 130 over wireless P2P connection 120. The second code is rendered within the interface screens on touch display 111 along with descriptive text instructing the customer to capture the second code using camera 132. Once camera 132 captures the second code, mobile application 135 decodes the second code and processes the instructions to notify mobile interface manager 119 to remote the transaction interface screens and corresponding options on mobile device 130.

Mobile interface manager 119 processes an interface that is remotely presented and accessed over wireless P2P connection 120 from mobile device 130. That is, interface screens and interface options within those screens that would typically be rendered on touch display 111 by transaction interface 118 are casted to or remoted on mobile device 130 by mobile interface manager 119. Such options may include a transaction type (withdrawal, deposit, account balance, transfer of funds between accounts of the customer, etc.), withdrawal/deposit/transfer entry field and/or selection options, cancel transaction, perform a second transaction following the first transaction, etc.

The remoted interface screens and corresponding interface options are executed on ATM 110 and merely rendered over wireless P2P connection 120 on a display of mobile device 130, such that no processing associated with the remoted interface is processed on mobile device 130. This provides additional security over what information is exposed over wireless P2P connection 120.

The remoted interface screens may be provided through web pages hosted by ATM 110 and delivered through browser 134 of mobile device 130. The remoted interface screens may alternatively or additionally be provided through mobile app 135. Once mobile application 135 notifies mobile interface manager 119 that the second code was decoded and is ready to continue the ATM transaction through touchless interaction via mobile device 130, mobile interface manager 119 remotes the interface screens and corresponding options through browser 134 and/or through mobile application 135.

The web browser 134 and/or mobile app 135 now includes a rendering of the remoted interface screens and options associated with the ATM transaction on a display of the mobile device 130. Selections made for options and/or input information into fields associated with the options are provided over wireless P2P network 120 to mobile interface manager 119. The selections and/or input information is correlated to what is expected by the transaction interface 118 and processed by a transaction manager of ATM 110, this causes transaction manager to: 1) access switch 140 and the corresponding financial server 170 (using a FI identifier that was part of card information read from card reader 112 when the customer card was presented (contact-based or contactless), obtain authorizations or denials (based on account information read from the card and encrypted PIN information entered for the PIN) from the backend system of financial server 170, and obtain account balance details from the backend system. Transaction screens are updated appropriately by the feedback provided from the backend system on touch display 111 and mobile interface manager renders updated transaction screens on mobile device 130 through web browser 134 and/or mobile app 135. Any peripheral that needs activated based on feedback from the backend system of the corresponding financial server 170 is activated and provided appropriate portions of the feedback needed by that peripheral. For example, an encrypted dispense command and an amount of cash to dispense from a valuable media depository/recycler are provided by the transaction manager to the depository/recycler causing the amount of cash to be dispensed from ATM 110 and the corresponding transaction interface screens on touch display 111 and the remoted interface screens provided over wireless P2P connection 120 to mobile device 130 are updated to indicate that the ATM is dispensing cash. Transaction logs and auditing information are updated by transaction manager to reflect dispensed cash or deposit cash.

Once the customer indicates that the transaction is completed or canceled and no additional transactions are desired through the remoted interface, mobile interface manager 119 instructions connection manager 117 to deactivate wireless transceiver 114, such that no wireless signal is sent from transceiver 114 and no wireless signals are detected or received from transceiver 114. This ensures that no wireless connection can be made to the ATM 110, which ensures security at ATM 110. When a next customer presents his/her card to card reader 112 and enters a PIN on encrypted PIN pad 113, connection manager 117 generates a new SSID and new passcode, activates wireless transceiver 114, configures wireless transceiver 114 with the new SSID and new passcode, generates a new barcode or QR code encoded with the new SSID and new passcode, and causes the new code to be presented by transaction interface 118 on interface screens of touch display 111.

In an embodiment, the first barcode or QR code presented after a card is presented and a PIN is entered is generated with a random SSID and passcode each time a transaction completes or is initiated on ATM 110 by connection manager 117.

Wireless connection 120 is terminated after a customer completes an ATM transaction that utilized wireless connection 120. Again, wireless transceiver 114 is deactivated, such that no wireless connection is possible until connection manager 117 reactivates wireless transceiver 114, which only occurs after a card is presented and a PIN is entered by a given customer at ATM 110.

A variety of embodiments are now presented for operation of system 100. It is to be noted that the embodiments are not mutually exclusive unless stated as such below, such that various combinations of embodiments can be utilized in combinations with one another.

In an embodiment, ATM 110 includes a non-touch display instead of touch display 111. In this embodiment, keys/keypad 113 are used to select options and enter input information from interface screens generated by transaction interface 118.

In an embodiment, card reader 112 is a chip-based card reader or a wireless contactless card reader, such as NFC contactless card reader.

In an embodiment, ATM 113 includes keys 113 that surround or are located along a periphery of display 111 and ATM also includes an encrypted PIN pad 113.

In an embodiment, wireless transceiver 114 is Universal Serial Bus (USB) wireless transceiver that is inserted to a USB port inside a secure housing of ATM 110 and therefore surrounded by metal and/or plastic that inhibit wireless signals being transmitted from wireless transceiver 114 when it is activated by connection manager 117. This restricts the range of the wireless signal to within a few feet (2-3 feet) of ATM 110 and ensures that only a mobile device 130 within a few feet is even capable of detecting the wireless signals.

In an embodiment, wireless transceiver 114 is a low energy Bluetooth® USB transceiver 114.

In an embodiment, wireless transceiver 114 is an NFC transceiver 114.

In an embodiment, wireless transceiver 114 is a Wi-Fi or Wi-Fi Direct USB wireless transceiver or a Wi-Fi or Wi-Fi Direct card inserted into a slot of a motherboard on ATM 110 that permits direct P2P wireless connections between ATM 110 and mobile device 130 without any intermediary wireless access point, router, or Internet connection being required.

In an embodiment, ATM 110 is a substantially headless ATM that lacks includes a small Liquid Crystal Display, such that the only the two encoded barcodes or QR codes are presented on the LCD and all other interface information is remoted from ATM 110 to mobile device 130.

In an embodiment, a receipt for the ATM transaction is pushed over wireless P2P connection 120 to mobile device 130 when the ATM transaction is terminated by the customer.

In an embodiment, ATM 110 provides the touchless transaction option but also provides a conventional transaction option based on customer touches to touch display 111 and/or keys/keypad 113. So, the customer can perform a conventional ATM transaction or select the touchless transaction option.

In an embodiment, financial server 170 provides a user-facing interface that allows customers to pre-stage a transaction. In this embodiment, once the user (via camera 132)

captures the two barcodes or QR codes (discussed above), the pre-staged transaction is automatically processed on behalf of the user, such that no transaction type and transaction input data is required through the remoted interface.

In an embodiment, any software associated with switch 150 remains unchanged with system 100, such that switch 150 is completely unaware of any touchless transaction being processed by ATM 130.

In an embodiment, switch 150 and financial servers 170 are modified to permit PIN-less transactions that are below a preset dollar amount, such that touchless transactions or touchless pre-staged transactions can be processed without the customer entering a PIN on encrypted PIN pad 113.

In an embodiment, mobile application 135 includes a user-facing interface that permits a customer to pre-stage a transaction and once the touchless transaction is initiated by the customer at ATM 110 (as described above with capturing of the two barcodes or QR codes), mobile application 135 performs the actions defined for the pre-staged transaction with the remoted interface provided by mobile interface manager 119. Here, the customer does not have to select the transaction type and provide any selections of input information through the remoted interface as the mobile application 135 automatically performs the necessary actions based on the user's pre-staged transaction defined within the user-facing interface of mobile application 135. In this way, a customer can set up preferred or routinely performed transactions within profile and once connected over the wireless P2P connection 120, the user facing interface allows the customer to select a pre-labeled transaction and mobile application performs the necessary interactions through the remoted interface on behalf of the customer.

In an embodiment, and based on any changed government regulations, the PIN entry may be performed through mobile application 135 using public-private key encryption that includes a private key accessible only from mobile device 130. Here, a public key associated with ATM 110 may be encoded in one of the two barcodes or QR codes upon initiation of a touchless transaction.

In an embodiment, the first barcode or QR code generated by connection manager 117 for establishing the wireless P2P connection 120 includes embedded scripting instructions that when captured by camera 132 automatically processes on mobile device 130 and connects using the encoded SSID and passcode. Here, mobile application 135 does not require any initiation on mobile device 130 to establish the wireless P2P connection 120 between ATM 110 and mobile device 130.

In an embodiment, the second barcode or QR code generated by connection manager for initiating the remoted interface includes embedded scripting instructions that when captured by camera 132 automatically initiates a browser 134 on mobile device 130 connected to a web site hosted on ATM 110. Here, mobile application 135 does not have to be provided at all with mobile device 130 and the entire touchless transaction can occur on an existing mobile device 130 that has no software changes at all.

In an embodiment, the first barcode or QR code causes the mobile device 130 to automatically connect to ATM 110 over wireless P2P connection 120 without mobile application 130 as discussed above and the second barcode or QR code includes embedded scripting instructions that cause mobile application 130 to be initiated on mobile device 130 for the remoted interface and/or cause mobile application 130 to be downloaded from an app store and then initiated for the remoted interface.

In an embodiment, connection manager 117 authenticates the wireless P2P connection 120 based on a unique pre-registered device identifier for mobile device 130. Mobile application 135 provides the unique pre-registered device identifier once connected over wireless P2P connection 120, and if connection manager 117 fails to detect an authenticated unique pre-registered device identifier, then connection manager 117 shuts down or deactivates wireless transceiver 114 to terminate wireless P2P connection 120.

In an embodiment, wireless P2P connection 120 utilizes/enforces a secure and encrypted wireless protocol such as Hypertext Transfer Protocol Secure (HTTPS).

In an embodiment, connection 120 is a secure direct wired connection, such as but not limited to a USB connection. In this embodiment, the ATM 110 may include a customer-facing USB port having a shutter that opens automatically once the first code is scanned and a connection is requested for a touchless transaction between the mobile device 130 and the ATM 110. The shutter closes when the transaction completes, and the cord is removed from the wired port. This ensures that nothing can be inserted into the port during operation of the ATM 110 when a secure connection was not verified and activated. In an embodiment, the wired port is deactivated as soon as the transaction completes, such that even if a customer kept the cord connected to the port after the transaction ends, the ATM 110 is incapable of receiving any data over the port. This ensures safety with the wired port.

In an embodiment, connection manager 117 and mobile application 135 negotiate and agree on a custom encryption key exchanged between one another when establishing the wireless P2P connection 120. The custom encryption key may be randomly generated and provided by connection manager 117 within the first barcode or QR code.

In an embodiment, authentication can be enforced at various points of interaction between the transaction terminal 110 and the mobile device 130. For example, the connection may be permitted on the mobile device's processing of the encoded connection information in the first code and authentication is enforced when the notification is provided by the mobile device 130 for the second code. In another case, the connection and remoted interface may be permitted but the transaction manager of the transaction terminal 110 only enforces authentication when options, selections, and input information are all provided for the transaction to be processed on the transaction terminal. In this way, authentication can be processed before any connection, during a connection, or near or at the end of the transaction. Additionally, in some embodiments, authentication is enforced at multiple points, such as before the connection is permitted, after the remoted interface is rendered, and during interactions with the remoted interface for the transaction.

In an embodiment, the order of receiving presenting and processing the first and second codes can be reversed. For example, the second code (as described above) can be provided for capturing first for remoting the transaction interface, the remoted interface may return an error because no connection is yet established and at this point the first code can be provided second, which establishes the connection and then causes a refresh with the remoted interface to make the remoted interface active over the connection, which was established after the remoted interface was rendered or attempted to be rendered. In this way, the order of operations is interchangeable between authorization, connection, and transaction command processing.

In an embodiment, terminal 110 is a Point-Of-Sale (POS) terminal or a Self-Service Terminal (SST) and transaction interface 118 is associated with a retail checkout performed through touchless interaction via mobile device 130.

These and other embodiments are now discussed with reference to FIGS. 2-4.

Figure 2:
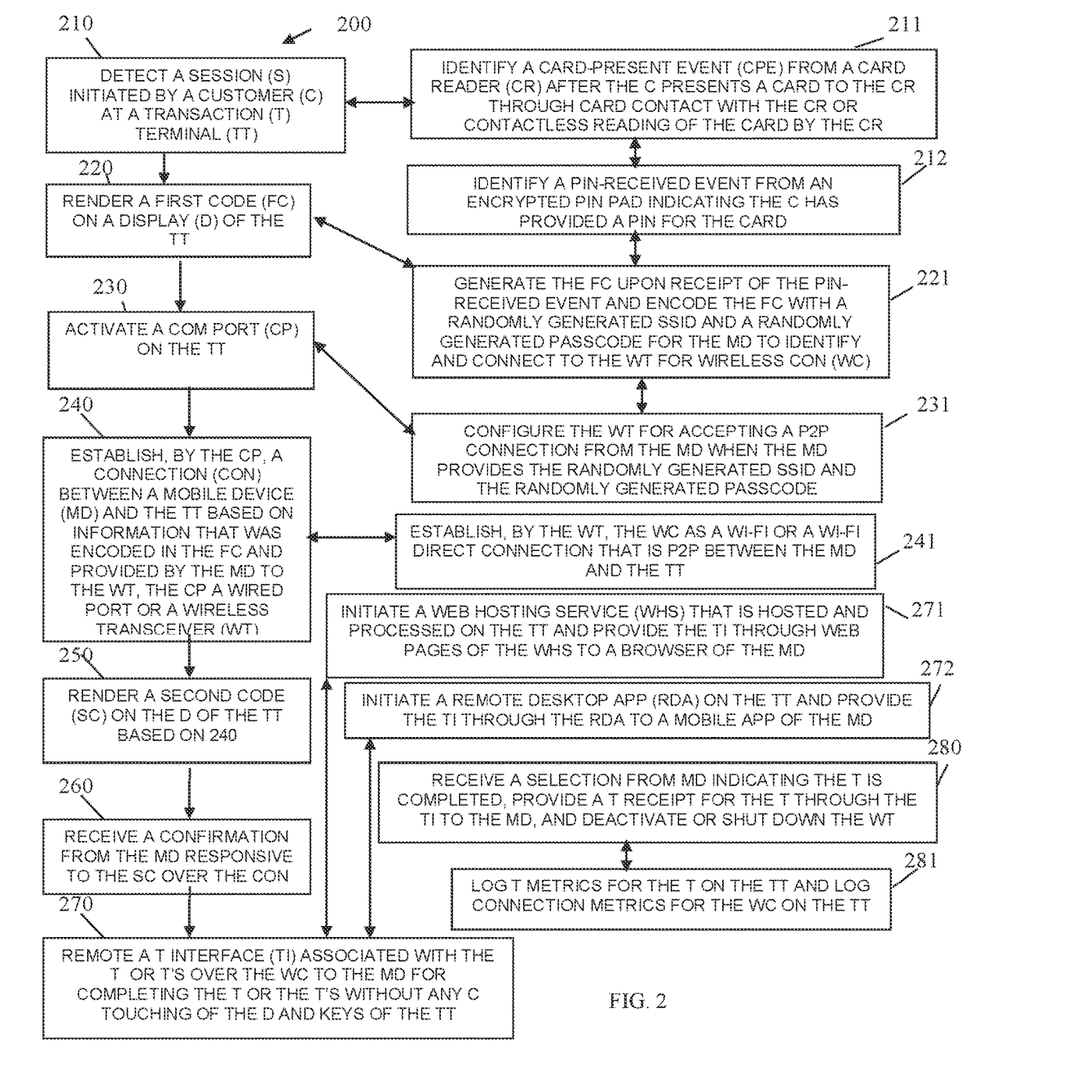
FIG. 2 is a diagram of a method for a touchless transaction on a transaction terminal, according to an example embodiment.

FIG. 2 is a diagram of a method 200 for a touchless transaction on a transaction terminal, according to an example embodiment. The software module(s) that implements the method 200 is referred to as a "touchless transaction manager." The touchless transaction manager is implemented as executable instructions programmed and residing within memory and/or a non-transitory computer-readable (processor-readable) storage medium and executed by one or more processors of a device. The processor(s) of the device that executes the touchless transaction manager are specifically configured and programmed to process the touchless transaction manager. The touchless transaction manager has access to one or more network connections during its processing. The network connections can be wired, wireless, or a combination of wired and wireless.

In an embodiment, the device that executes the touchless transaction manager is a transaction terminal. In an embodiment, the transaction terminal is ATM 110, a POS terminal, or an SST.

In an embodiment, the touchless transaction manager is all of or some combination of 117, 118, and/or 119.

At 210, the touchless transaction manager detects a session initiated by a customer at a transaction terminal.

In an embodiment, at 211, the touchless transaction manager identifies a card-present event from a card reader after the customer presents the card to the card reader through card contact with the card reader or through contactless (wireless) reading of the card by the card reader.

In an embodiment of 211 and at 212, the touchless transaction manager identifies a PIN-received event from an encrypted PIN pad that indicates the customer has provided a PIN for the card.

At 220, the touchless transaction manager renders a first code on a display of the transaction terminal. The first code is associated with descriptive text, which is also presented adjacent to the first code on the display. The first code associated with an option within a transaction interface of the transaction terminal to continue the transaction without any additional touching being required by the customer of the display or keys/keypad of the transaction terminal using the customer's mobile device to continue with the transaction.

In an embodiment of 212 and 220, at 221, the touchless transaction manager generates the first code upon receipt of the PIN-received event and the touchless transaction manager encodes the first code with a randomly generated SSID and a randomly generated passcode for the mobile device of the customer to identify and connect to the wireless transceiver of the transaction terminal.

At 230, the touchless transaction manager activates a communication port of the transaction terminal. The communication port was deactivated until the processing of 230. The communication port is a wired port for a wired connection between the transaction terminal and the mobile device or the communication port is a wireless transceiver for a wireless connection between the transaction terminal and the mobile device.

In an embodiment of 221 and 230, at 231, the touchless transaction manager configures the wireless transceiver for accepting a P2P connection from the mobile device when the mobile device provides the randomly generated SSID and the randomly generated passcode.

At 240, the communication port establishes a connection between the mobile device and the transaction terminal based on information that was encoded in the first code and provided by the mobile device to the communication port. Again, the port can be a wired port for a wired connection or a wireless transceiver for a wireless connection.

In an embodiment, at 241, the wireless transceiver establishes the wireless connection as a Wi-Fi or a Wi-Fi Direct connection that is a P2P between the mobile device and the transaction terminal.

At 250, the touchless transaction manager renders a second code on the display of the transaction terminal based on 240 (having established the connection (wired for a wired port or wireless for a wireless transceiver) between the mobile device and the transaction terminal).

At 260, the touchless transaction manager receives a confirmation from the mobile device that is responsive to the second code over the connection. The confirmation confirms or acknowledges that the customer desires to continue with the transaction through interaction with the mobile device and without having to touch any touch display options or key-based options on the transaction terminal.

At 270, the touchless transaction manager remotes a transaction interface associated with the transaction or the transactions over the connection to the mobile device for completing the transaction or the transactions without any customer touching of the display and keys of the transaction terminal.

In an embodiment, at 271, the touchless transaction manager initiates a web hosting service that is hosted and processed on the transaction terminal. The touchless transaction manager provides the transaction interface through web pages of the web hosting service to a browser of the mobile device.

In an embodiment, at 272, the touchless transaction manager initiates a remote desktop application on the transaction terminal and provides the transaction interface through the remote desktop application to a mobile application of the mobile device.

In an embodiment, at 280, the touchless transaction manager receives a selection from the mobile device indicating that the transaction is completed and that no additional transactions are being requested by the customer. Based on receipt of this selection, the touchless transaction manager provides a transaction receipt for the transaction through the transaction interface over the wireless connection to the mobile device, and the touchless transaction manager deactivates or shuts down the wireless transceiver, such that the transaction terminal is incapable of establishing any additional wireless connection until the touchless transaction manager reactivates the wireless transceiver.

In an embodiment of 280 and at 281, the touchless transaction manager logs transaction metrics for the transaction on the transaction terminal and logs connection metrics for the wireless connection on the transaction terminal.

Figure 3:
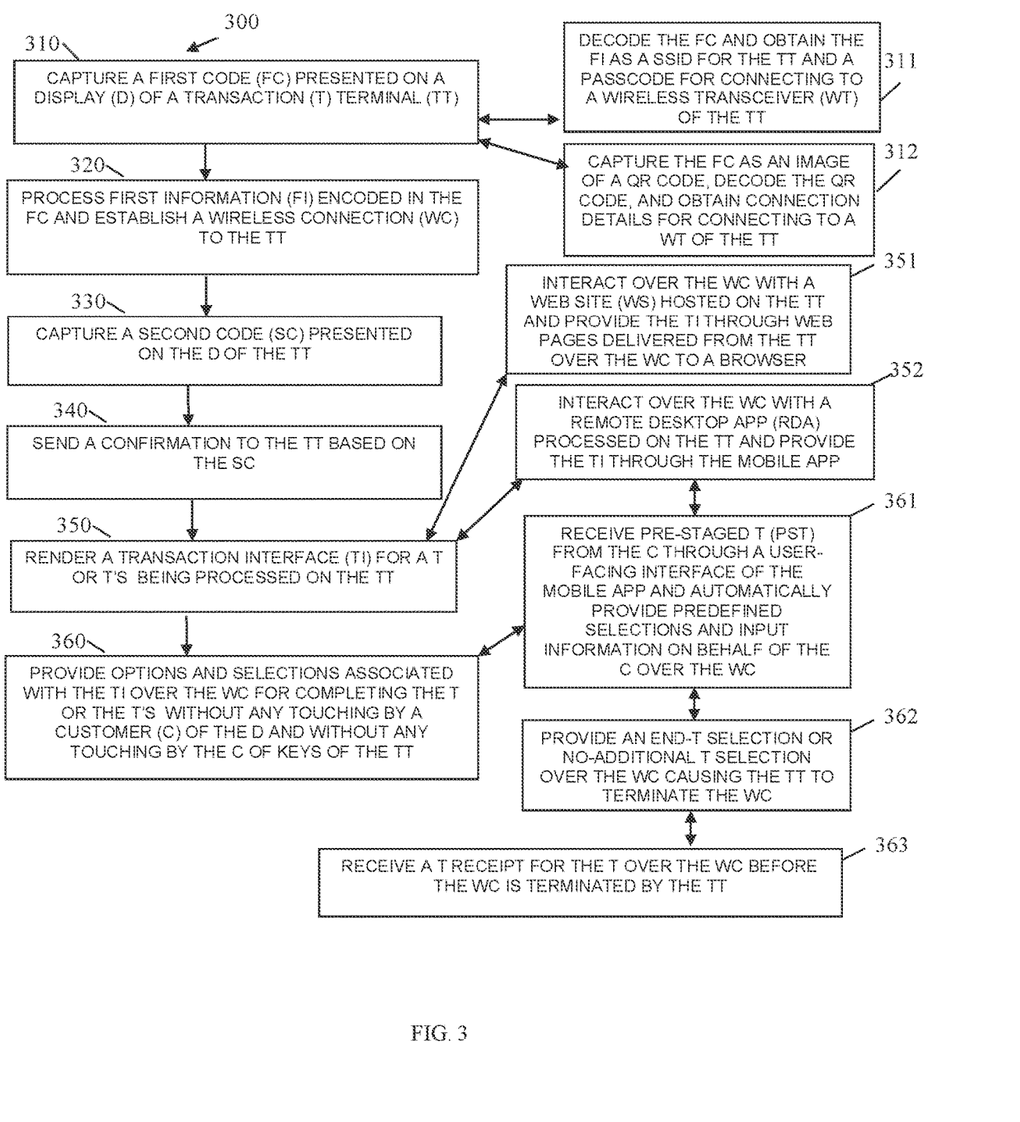
FIG. 3 is a diagram of another method for a touchless transaction on a transaction terminal, according to an example embodiment.

FIG. 3 is a diagram of another method 300 for a touchless transaction on a transaction terminal, according to an example embodiment. The software module(s) that implements the method 300 is referred to as a "remoted interface manager." The remoted interface manager is implemented as executable instructions programmed and residing within memory and/or a non-transitory computer-readable (processor-readable) storage medium and executed by one or more processors of a device. The processors that execute the remoted interface manager are specifically configured and programmed to process the remoted interface manager. The remoted interface manager has access to one or more network connections during its processing. The network connections can be wired, wireless, or a combination of wired and wireless.

In an embodiment, the device that executes the remoted interface manager is mobile device 130. In an embodiment, mobile device 130 is a phone, a tablet, a laptop, or a wearable processing device.

In an embodiment, the touchless transaction manager is all or some combination of 134 and/or 135.

The remoted interface manager presents the interaction between terminal 110 and/or method 200 with mobile device 130 from the perspective of mobile device 130.

At 310, the remoted interface manager captures a first code presented on a display of the transaction terminal. The remoted interface manager utilizes a camera to capture an image of the first code, and the camera is integrated into the mobile device that executes the remoted interface manager.

In an embodiment, at 311, the remoted interface manager decodes the first code and obtains the first information as a SSID and a passcode for connecting the mobile device to a wireless transceiver of the transaction terminal.

In an embodiment, at 312, the remoted interface manager captures the first code as a QR code, decodes the QR code, and obtains connection details for connecting to a wireless transceiver of the transaction terminal.

At 320, the remoted interface manager processes first information encoded in the first code and establishes a wireless connection to the transaction terminal.

At 330, the remoted interface manager captures a second code presented on the display of the transaction terminal.

At 340, the remoted interface manager sends a confirmation to the transaction terminal over the wireless connection based on capturing the second code at 330.

At 350, the remoted interface manager renders a transaction interface for a transaction being processed on the transaction terminal.

In an embodiment, at 351, the remoted interface manager interacts over the wireless connection with a web site hosted on the transaction terminal, and the remoted interface manager provides the transaction interface through web pages delivered from the transaction terminal over the wireless connection to a browser that executes on the mobile device.

In an embodiment, at 352, the remoted interface manager interacts over the wireless connection with a remote desktop application that is processed on the transaction terminal, and the remoted interface manager provides the transaction interface through the mobile application that executes on the mobile device.

At 360, the remoted interface manager provides options and selections associated with the transaction interface over the wireless connection for completing the transaction or transactions without any touching by the customer of the transaction terminal display and without any touching of the transaction terminal keys/keypad.

In an embodiment of 352 and 360, at 361, the remoted interface manager receives a pre-staged transaction selection for a pre-staged transaction through a user-facing interface of a mobile application that executes on the mobile device. Responsive to the pre-staged transaction selection, the remoted interface manager obtains predefined selections and input information defined in the pre-staged transaction, and the remoted interface manager automatically provides the predefined selections and input information on behalf of the customer over the wireless connection to complete the transaction as defined by the pre-staged transaction and without the user being required to make any selections of the options and the selections associated with the transaction interface.

In an embodiment of 361 and at 362, the remoted interface manager provides an end-transaction selection or a no-additional transaction selection over the wireless connection causing the transaction to terminate the wireless connection.

In an embodiment of 362 and at 363, the remoted interface manager receives a transaction receipt for the transaction over the wireless connection before the wireless connection is terminated by the transaction terminal.

Figure 4:
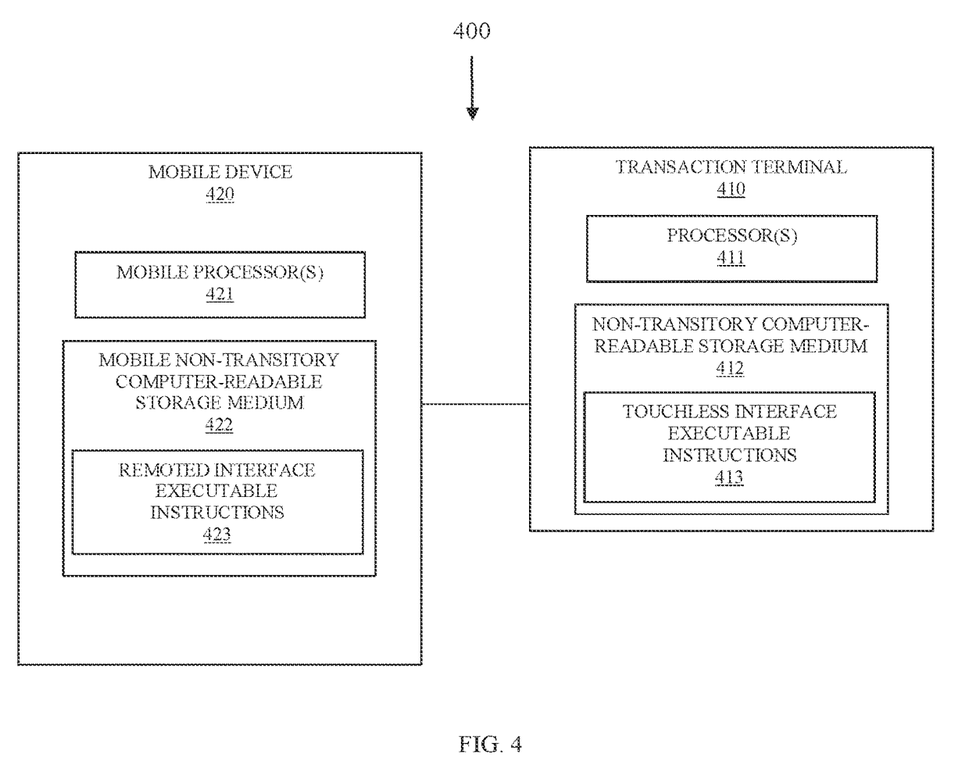
FIG. 4 is a diagram of another system for a touchless transaction on a transaction terminal, according to an example embodiment.

FIG. 4 is a diagram of another system 400 for a touchless transaction on a transaction terminal, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a transaction terminal 410 having at least one processor 411 and a non-transitory computer-readable storage medium 412 comprising touchless interface executable instructions 413. The system 400 further includes a mobile device 420. The mobile device comprises at least one mobile processor 421 and a mobile non-transitory computer readable storage medium 422 having remoted interface executable instructions 423.

In an embodiment, the touchless interface executable instructions 413 are all of or some combination of 117, 118, 119, and/or the method 200.

In an embodiment, the remoted interface executable instructions 433 are all of or some combination of 134, 135, and/or the method 300.

In an embodiment, transaction terminal 410 is a POS terminal, a SST, a kiosk, or an ATM.

In an embodiment, mobile device 420 is a mobile phone, a tablet computer, a laptop computer, or a wearable processing device.

The touchless interface executable instructions 413 when executed by the processor 411 from the non-transitory computer-readable storage medium 412 cause the processor 413 to perform processing comprising: 1) displaying a first QR code on a transaction display of the transaction terminal 410 upon detection of a transaction being performed by a customer at the transaction terminal 410; 2) activating a wireless transceiver that is configured with first information encoded in the first QR code; 3) detecting a wireless connection to the wireless transceiver with the mobile device 420 based on the first information; 4) displaying a second QR code on the transaction display; 5) receiving a notification from the mobile device 420 that is responsive to the second QR code; 6) remoting a transaction interface associated with the transaction from the transaction terminal 410 to the mobile device 420 as a remoted interface over the wireless connection; and 7) processing selections and input information received from the remoted interface executable instructions 423 of the mobile device 420 and completing the transaction on the transaction terminal 410 without the customer touching the transaction display and without the customer touching keys of the transaction terminal 410.

The remoted interface executable instructions 433 when executed by the mobile processor 431 from the mobile non-transitory computer-readable storage medium 432 causes the mobile processor 431 to perform processing comprising: 1) capturing, by a camera of the mobile device 420, the first QR code from the transaction display; 2) decoding the first QR code and obtaining connection information for connecting to the wireless transceiver; 3) processing the connection information and connecting to the wireless connection of the wireless transceiver; 4) capturing, by the camera of the mobile device 420, the second QR code from the transaction display; 5) providing the confirmation based on the second QR code over the wireless connection; 6) rendering the remoted interface associated with the transaction interface on a mobile display of the mobile device 420 as received from the touchless interface executable instructions 413 over the wireless connection; 7) receiving the selections and input information provided by the customer through the remoted interface; and 8) providing the selections and the input information over the wireless connection to the touchless interface executable instructions 413 for completing the transaction being processed on the transaction terminal 410.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method comprising:
rendering a transaction interface on a display of a transaction terminal;
detecting a session initiated by a customer at the transaction terminal;
activating a communication port for a wireless transceiver of the transaction terminal;
rendering a first code on the display, the first code comprising instructions for a mobile device to wirelessly connect to the transaction terminal;
establishing a connection between the mobile device and the transaction terminal based on information encoded in the first code;
rendering a second code on the display, the second code comprising encoded instructions for remoting interface screens and options associated with the transaction interface;
receiving a confirmation from the mobile device over the connection; and
remoting the transaction interface over the connection to the mobile device for completing a transaction without customer touching of the display or keys of the transaction terminal.

2. The method of claim 1, wherein the first code is a Quick Response (QR) code.

3. The method of claim 1, wherein the wireless connection is established as a Wi-Fi Direct connection.

4. The method of claim 1, wherein the transaction interface is provided through web pages to a browser of the mobile device.

5. The method of claim 1, wherein the transaction interface is provided through a mobile application of the mobile device.

6. The method of claim 1, further comprising logging transaction metrics for the transaction on the transaction terminal.

7. The method of claim 1, wherein the transaction terminal is an Automated Teller Machine (ATM).

8. The method of claim 1, wherein the transaction terminal is a Point-Of-Sale (POS) terminal.

9. The method of claim 1, wherein the transaction terminal is a self-service terminal (SST).

10. The method of claim 1, wherein the transaction terminal is a kiosk.

11. The method of claim 1, wherein the session is initiated by detecting a presence of a card at a card reader of the transaction terminal.

12. The method of claim 1, wherein the session is initiated by identifying a personal identification number (PIN) received event from an encrypted PIN pad.

13. A method comprising:
capturing, by a camera of a mobile device, a first code displayed on a transaction terminal;
establishing, by a processor of the mobile device, a wireless connection to the transaction terminal based on the first code;
capturing a second code displayed on the transaction terminal;
sending a confirmation to the transaction terminal based on the second code;
remoting a transaction interface from the transaction terminal to the mobile device; and
completing a transaction using the remoted transaction interface without physical interaction with the transaction terminal.

14. The method of claim 13, wherein the first code includes a service set identifier (SSID) and a passcode.

15. The method of claim 13, wherein the second code includes encoded instructions for remoting the transaction interface.

16. The method of claim 13, wherein the transaction interface is rendered on a mobile display of the mobile device.

17. The method of claim 13, wherein the wireless connection is a peer-to-peer (P2P) connection.

18. The method of claim 13, wherein the transaction interface is interacted with through a web browser on the mobile device.

19. A system comprising:
a transaction terminal with a processor and a non-transitory computer-readable storage medium including executable instructions;
a mobile device with a camera and a processor;
the executable instructions, when executed by the processor of the transaction terminal, cause the transaction terminal to perform operations including:
rendering a transaction interface on a display;
detecting a session initiation;
activating a communication port;
rendering a first code for establishing a wireless connection;
rendering a second code for remoting the transaction interface; and
processing input for a transaction from the mobile device without customer touching of the transaction terminal.

20. The system of claim 19, wherein the mobile device is a phone, a tablet, a laptop, or a wearable processing device, and the executable instructions further cause the processor of the mobile device to capture the first and second codes, establish the wireless connection, remote the transaction interface, and provide input for the transaction.

* * * * *